United States Patent [19]

Queveau

[11] 4,320,811
[45] Mar. 23, 1982

[54] ARTICULATED VEHICLE DRIVE AND CONTROL SYSTEM
[76] Inventor: Gérard Queveau, Amik Farm, 79140 Le Pin, Cerizay, France
[21] Appl. No.: 122,466
[22] Filed: Feb. 19, 1980
[30] Foreign Application Priority Data
Feb. 21, 1979 [FR] France .................. 79 04363
[51] Int. Cl.$^3$ ............................................. B62D 47/02
[52] U.S. Cl. ................................ 180/14 A; 280/432; 280/424
[58] Field of Search ............... 180/14 A, 14 B, 14 D, 180/14 E, 14 R, 242, 243; 280/432, 446 B, 424, 403

[56] References Cited
U.S. PATENT DOCUMENTS

| | | | |
|---|---|---|---|
| 2,194,811 | 3/1940 | Rice | 180/14 B |
| 2,922,481 | 1/1960 | Hütter et al. | 180/14 A |
| 3,061,030 | 10/1962 | Shallenberg | 180/12 |
| 3,352,373 | 11/1967 | Tuck | 180/243 |
| 3,354,977 | 11/1967 | Swift | 180/243 |
| 3,360,064 | 12/1967 | Budzich et al. | 180/14 A |
| 3,361,223 | 1/1968 | Bauer | 180/243 |
| 3,374,847 | 3/1968 | Budzich | 180/243 |
| 3,584,698 | 6/1971 | Larson et al. | 180/14 A |
| 3,817,341 | 6/1974 | Greene | 180/14 D |
| 3,865,208 | 2/1975 | Crawshay et al. | 180/6.48 |
| 3,874,470 | 4/1975 | Greene | 180/14 A |
| 3,913,697 | 10/1975 | Greene | 180/14 A |
| 3,994,352 | 11/1976 | Greene | 180/14 A |

FOREIGN PATENT DOCUMENTS

| | | |
|---|---|---|
| 857893 | 12/1952 | Fed. Rep. of Germany . |
| 921304 | 12/1954 | Fed. Rep. of Germany . |
| 933134 | 11/1956 | Fed. Rep. of Germany . |
| 1066875 | 10/1959 | Fed. Rep. of Germany . |
| 1964708 | 12/1970 | Fed. Rep. of Germany . |
| 1937624 | 3/1971 | Fed. Rep. of Germany . |
| 2823519 | 10/1979 | Fed. Rep. of Germany ... 180/14 A |
| 2142300 | 11/1973 | France . |

OTHER PUBLICATIONS
Patent Abstracts of Japan, vol. 1, No. 62, Jun. 17, 1977, p. 779M77, Kokai No. 52-11511.

Primary Examiner—John A. Pekar
Attorney, Agent, or Firm—Leydig, Voit, Osann, Mayer & Holt, Ltd.

[57] ABSTRACT

A drive and control system for articulated vehicles which has the capacity of operating the vehicle either in a push-mode, with only the wheels of the rear section being driven, or in a hybrid mode in which a portion of the power is applied to the rear wheels of the forward section. The hybrid mode of operation is employed under conditions tending to promote jackknifing and/or loss of rear tire traction. In a preferred embodiment of the invention, the tendency to jackknife is monitored by effectively sensing the transverse component of the connection force between the forward and rear vehicle sections. The distribution of power between the rear driving wheels and driving wheels of the forward section may be controlled as a function of the magnitude and direction of the connection force. A specially adapted articulation connection is provided to sense the magnitude and direction of the connecting force.

11 Claims, 16 Drawing Figures

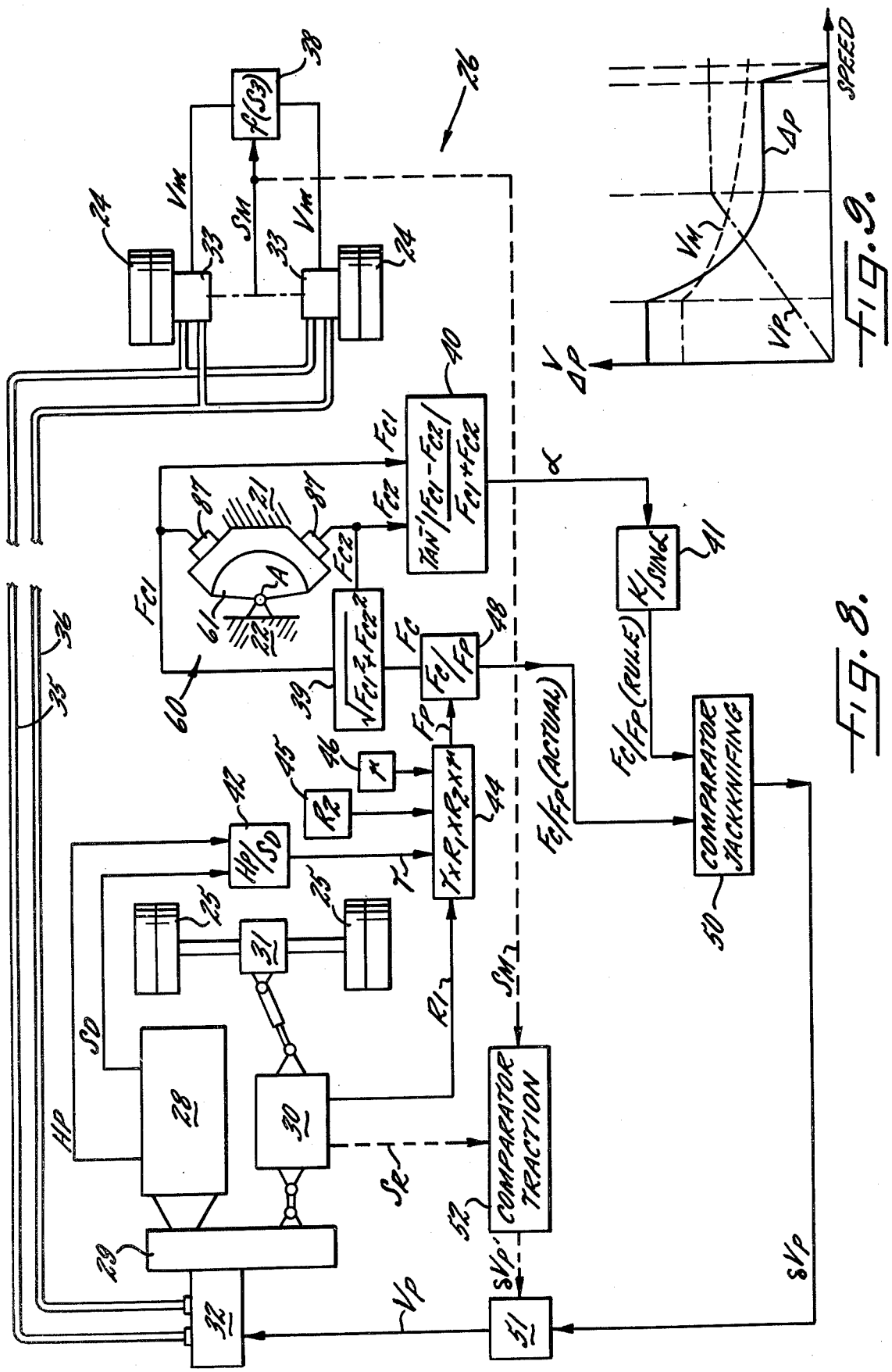

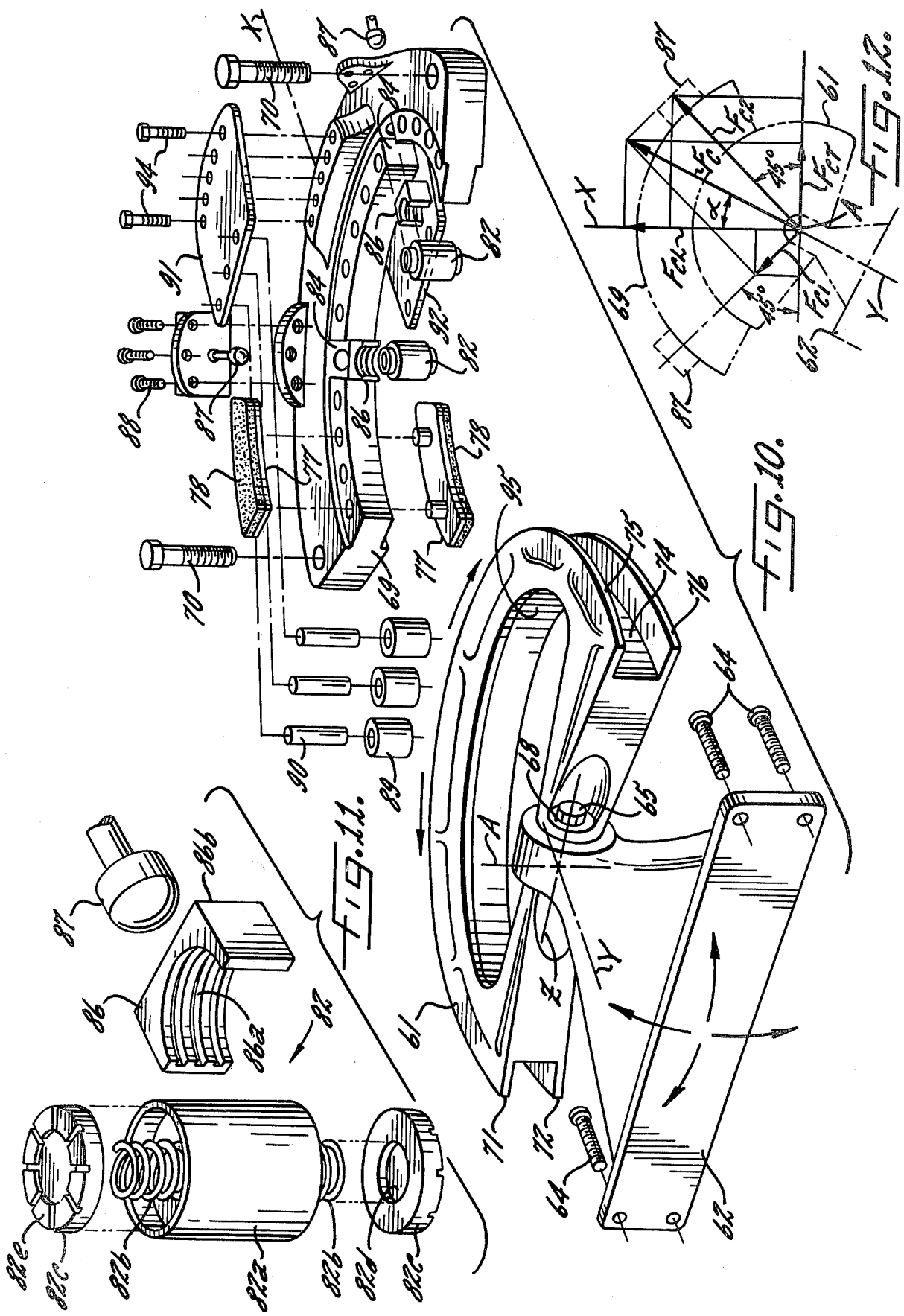

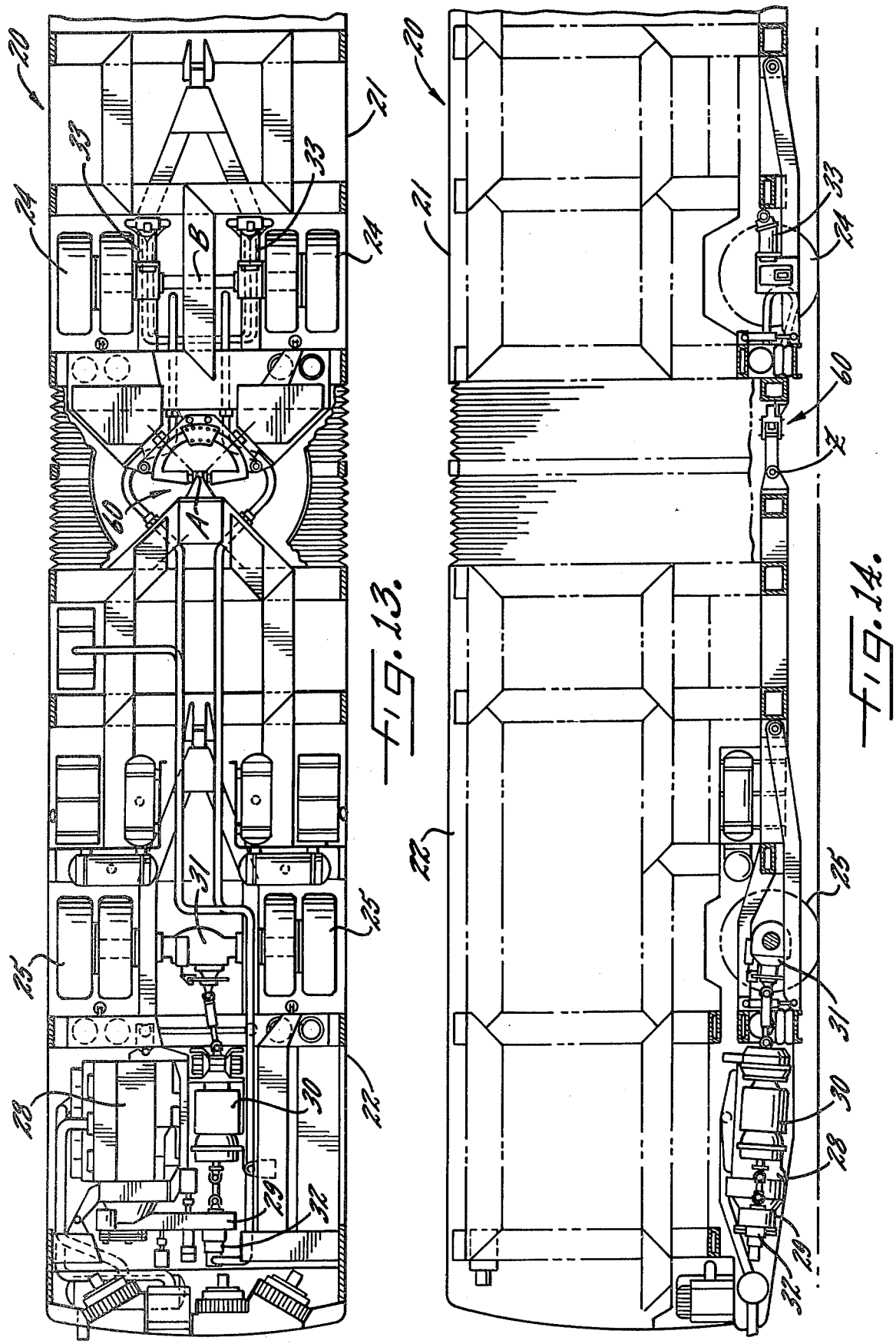

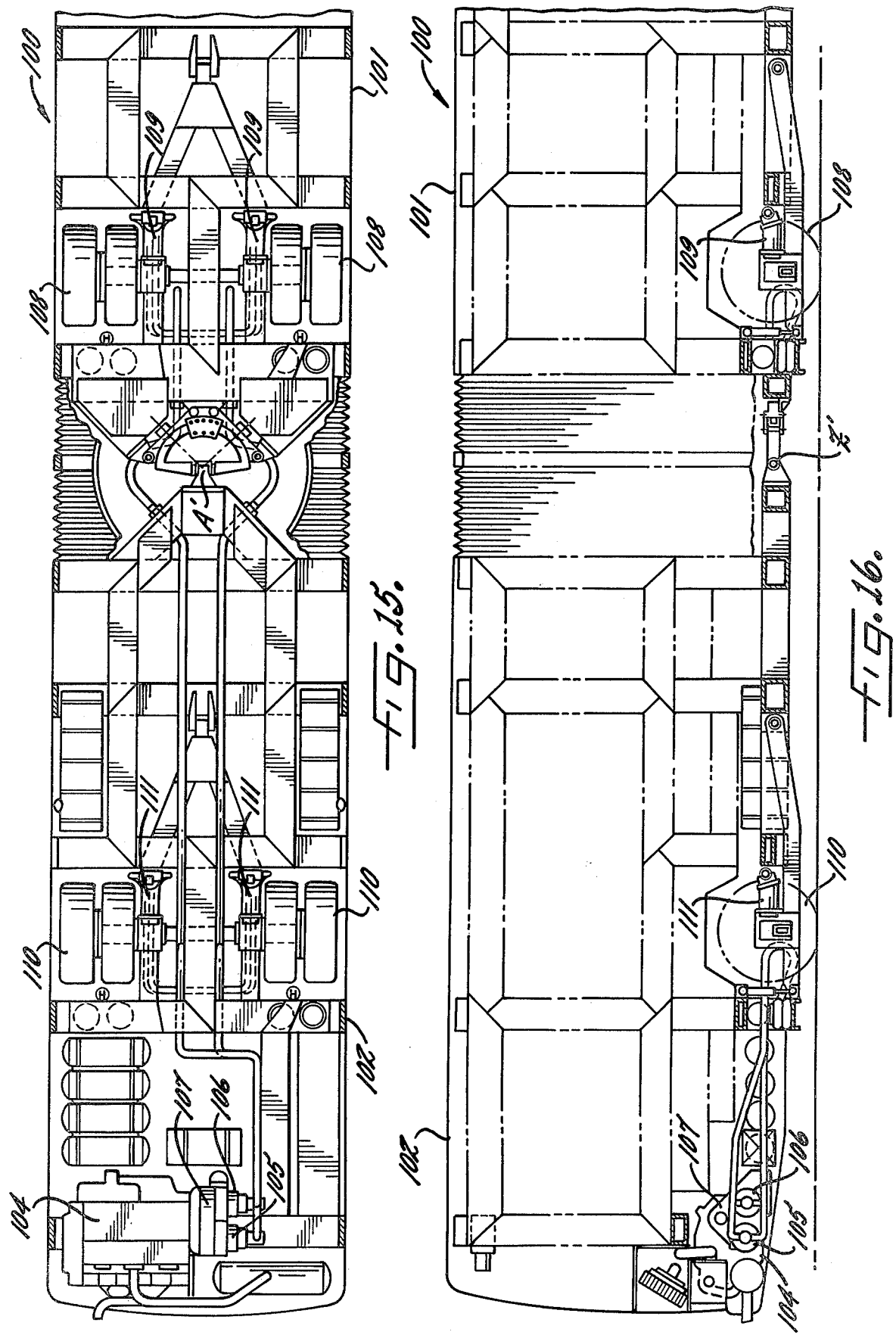

ARTICULATED VEHICLE DRIVE AND CONTROL SYSTEM

The present invention relates to drive and control systems for articulated vehicles, e.g., high volume mass transportation articulated buses having a forward and a rear section connected at an articulation point. Typically the forward section has front, steering wheels and rear, non-steering wheels. The rear section typically has a single set of wheels which are either steering or non-steering depending upon whether the wheels are free-wheeling or driven, respectively.

Known drive systems for articulated buses may be catagorized by reference to which axle is driven and to the engine position. Combinations and permutations considered practical are discussed by Brechbuhl et al., International Commission for the Study of Motor Buses: "(a) Technical and Economic Aspects of Articulated Buses", 43rd International Congress—Helsinki (1979), pp. 6–9. To drive the rear wheels of the forward section, hereinafter sometimes the "middle axle wheels (or tires)" or simply "middle wheels", the engine is usually mounted on the forward section, whether it be at the extreme front, mid-section at the longitudinal center line of the forward section, or mid-section to one side of the forward section. Advantages of a driven middle wheels and forward section engine mounting are good control and stability on slippery road surfaces and on steep grades. Furthermore, inasmuch as the forward section is "pulling" the rear section, the phenomenon of "jackknifing" is not typically encountered. Disadvantages, however, arise from engine compartment intrusion into the forward section passenger compartment, often manifested in raising the height of all or part of the vehicle floor; engine noise; and/or engine cooling problems depending upon where the engine is located. An engine position at the rear of the rear section, generally considered advantageous for optimal noise control and low floor height, might be used with middle wheel drive, but a long, conventional mechanical drive train from the rear section of the bus through the articulation point would be a serious disadvantage.

An alternative to driving the middle wheels is to drive the wheels of the rear section, hereinafter sometimes simply the "rear wheels (or tires)". Such an arrangement is particularly suited for rear engine mounting which, as already suggested, offers certain advantages. One well recognized disadvantage of such a "push"-type rear engine/rear wheel drive system, however, is instability resulting in jackknifing on slippery road surfaces and steep grades. Considered generally, one component of the force which the rear wheels exert upon the forward section at the articulation connection when driving and when there is an angle of articulation between the vehicle sections tends to jackknife the vehicle under conditions of reduced traction. Extreme caution in the application of power to the rear driving wheels must be employed to maintain control. One known approach to preventing such jackknifing in push-type articulated buses is disclosed in U.S. Pat. No. 4,106,792. This patent discloses a system for damping the articulation when the vehicle is traveling straight, or nearly so, and for completely blocking further articulation after reaching a predetermined maximum acceptable articulation angle for a given steering angle. In addition to the space requirements of such a blocking system, which may adversely affect the desirable low floor height of the vehicles in which it is employed, the system inherently looses the benefit of that portion of the drive power tending to jackknife the vehicle by simply resisting it with the structural blocking members. Furthermore, in some instances the manuverability of the bus may be inhibited by the articulation blocking system since angle alone, without consideration of speed or road conditions, initiates the implementation of the system.

A primary object of the present invention is to provide an articulated bus drive and control system which offers the advantages of both rear engine/rear wheel drive and middle wheel drive stability. More specifically, the articulated bus drive of the present invention offers the efficiency of rear engine, rear wheel drive under most driving conditions, with a dual system of rear and middle wheel drive being activated only at relatively high articulation angles and/or under certain adverse road conditions.

Another object of the present invention is to provide an articulated bus drive with the capability of rear engine, middle wheel drive with a particularly simple and compact articulation mechanism.

Yet another object of the present invention is to provide an articulated bus drive which efficiently employs rear engine, middle wheel drive through selectively engaging the middle wheel drive only at high articulation angles and/or under adverse road conditions.

A related object is to provide an articulated bus drive which offers the advantages of rear engine, rear wheel drive yet maintains cornering stability at higher power levels than heretofore possible.

These and other objects and advantages of the invention will become apparent upon reading the following detailed description and upon reference to the drawings, in which:

FIG. 8 is a schematic of an articulated bus drive and control system of the present invention.

FIG. 9 is a graph of $V_p$, $V_m$ and $\Delta P$ versus vehicle speed for a drive system as shown in FIG. 8.

FIG. 10 is an exploded view of an articulation interconnection between the front and rear sections of a bus having a drive system of the present invention.

FIG. 11 is an exploded view of the force transmission/measurement arrangement within the articulation interconnection of FIG. 10;

FIG. 12 is a vector diagram showing the derivation of $F_C$ from $F_{C1}$ and $F_{C2}$;

FIG. 13 is a partial plan view of the chassis of an articulated bus having a drive of the present invention;

FIG. 14 is a partial side elevation of the articulated bus chassis and drive of FIG. 13;

FIG. 15 is a partial plan view of an articulated bus chassis having a second embodiment of a drive of the present invention;

FIG. 16 is a partial side elevation of the articulated bus chassis and drive of FIG. 15;

In any driven-wheel vehicle, a propulsion force, hereinafter sometimes $F_P$, is generated by the engine and drive train and exerted at the driving tire peripheries. This propulsion force $F_P$ gives rise to a reactive traction force $F_T$ exerted by the road surface on the driving tires. For a push-type articulated vehicle, the reactive traction force $F_T$ is exerted by the road surface on the rear driving tires. This force at the rear driving tires can be designated $F_{TR}$. The free-wheeling forward section is, in turn, propelled by the driving action of rear section, giving rise to a connection force $F_C$ at the point of articulation.

Figure 1:
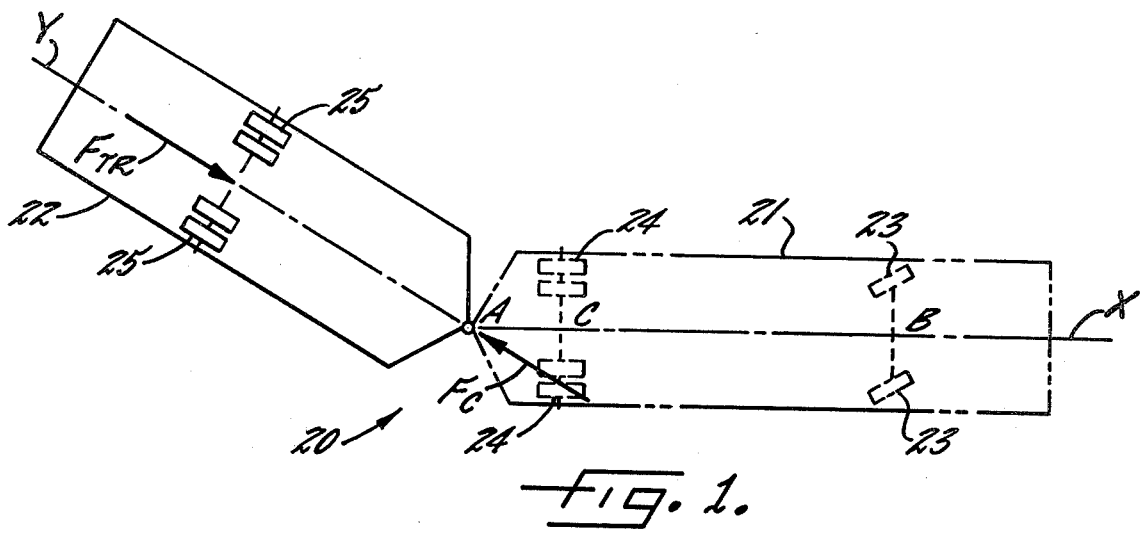
FIG. 1 is a plan diagram showing the primary forces acting upon the rear section of a push-type articulated vehicle.

Considering the forces acting upon the sections of a push-type articulated vehicle in more detail, FIG. 1 depicts in plan view such a vehicle 20 having a forward section 21 (in phantom) and a rear section 22 connected for articulation relative to the forward section about point A. The front, middle and rear tires (and wheels) are shown as items 23, 24 and 25, respectively. The vehicle is shown negotiating a turn at an articulation angle $\alpha$ between the longitudinal axes X and Y, respectively, of the forward and rear vehicle sections. The figure illustrates the primary forces acting on the rear section 22. As already explained, the propulsive force $F_P$ presented at the peripheries of the rear driving tires 25 by the engine and drive train gives rise to a reactive traction force $F_{TR}$ exerted by the road surface upon the rear tires. Another principal force acting upon the rear section 22 is the reactive connection force $F_C$ at the articulation point A representing the resistance exerted by the forward section 21 in response to the driving action of the rear section. Various other forces (not shown) include that required to accelerate the rear section 22, the force-equivalent of rolling friction losses, the component of the rear section weight parallel to the road surface if traveling up an incline, etc. These forces oppose the traction force $F_{TR}$, with the result that when the forces acting on the rear section are summed, $F_C$ will be somewhat less than $F_{TR}$, the actual difference depending upon a variety of variables, including the rate of acceleration, the coefficient of rolling friction, the grade, etc.

Figure 2:
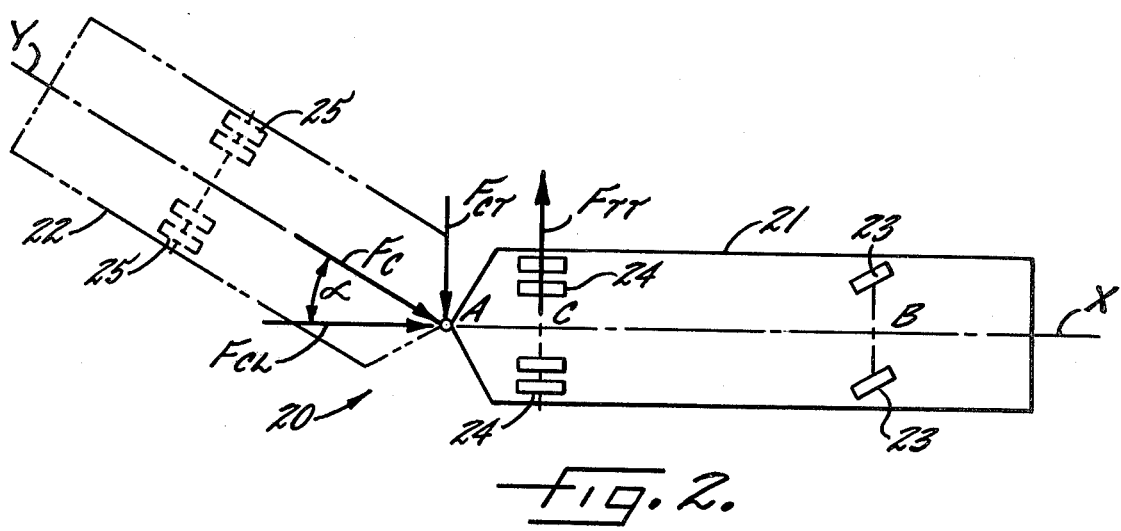
FIG. 2 is a plan diagram showing the primary forces acting upon the forward section of a push-type articulated vehicle.

FIG. 2 is a view similar to that in FIG. 1 illustrating the primary forces acting on the forward section 21. These forces include the connection force $F_C$ transmitted to the forward section 21 through the articulation point A by the driven rear section 22. It will be appreciated that this force $F_C$ is equivalent to the force $F_C$ in FIG. 1, only shown to be opposite-acting in view of the shift in focus from the rear to the forward section. In both instances $F_C$ is aligned with the axis Y of the rear section. FIG. 2 shows $F_C$ broken down into orthogonal vector components, a force $F_{CT}$ transverse to the forward section 21 and a force $F_{CL}$ along the longitudinal axis X of the forward section. For a given angle of articulation $\alpha$, $F_{CT}=F_C \sin \alpha$, while $F_{CL}=F_C \cos \alpha$. The other primary force acting on the forward section is a transverse, reactive, traction force $F_{TT}$ exerted by the road surface on the middle tires 24. The force $F_{TT}$ is a function of the load $W_M$ on the middle tires 24 and the coefficient of static friction $\mu$ between the tires and the road surface; i.e., $F_{TT}=W_M \cdot \mu$. Inasmuch as this force $F_{TT}$ is a passive reactive force, its instantaneous magnitude, up to the maximum limit from the above relationship, is a function of the magnitude of the opposite-acting force component, primarily $F_{CT}$. For convenience in the discussion which follows, however, $F_{TT}$ will be used to represent the upper limit of that reactive force for a given $W_M$ and $\mu$, as opposed to the instantaneous value.

With $F_C$ and $F_{TT}$ acting at the rear of the forward section, jackknifing will tend to occur when the balance of forces generates a net counterclockwise moment above a pivot point B, approximately mid-point between the front wheels 23. Accordingly, the vehicle will be stable when:

$$F_{CT} \cdot AB < F_{TT} \cdot BC$$

where AB is the distance between points A and B and where BC is the lesser distance between points B and C, the latter point being between the middle wheels 24. Substituting $F_C \sin \alpha$ for $F_{CT}$ and solving for $F_C$, yields the following relationship:

$$F_C < W_M \cdot \mu \cdot BC \, (1/\sin \alpha)/AB$$

Accordingly, so long as $F_C$ is limited according to the above relationship, jackknifing through transverse slippage of the middle tires 24 will not occur. From the above discussion, it will be appreciated that a reduction in the connection force $F_C$ must be effected by reducing the rear tire traction force $F_{TR}$.

The present invention offers a system for reducing the magnitude of the force $F_{TR}$ and, consequently, the force $F_C$ at the articulation point A to avoid jackknifing even while maintaining a substantially constant power level. This is accomplished through selectively dividing the power between the rear and middle tires 25 and 24, respectively. That is, the mode of operation of the vehicle 20 is converted from a classic push-type system in which only the rear set of tires are driven to a hybrid system in which both the rear and middle sets of tires are driven.

Figure 3:
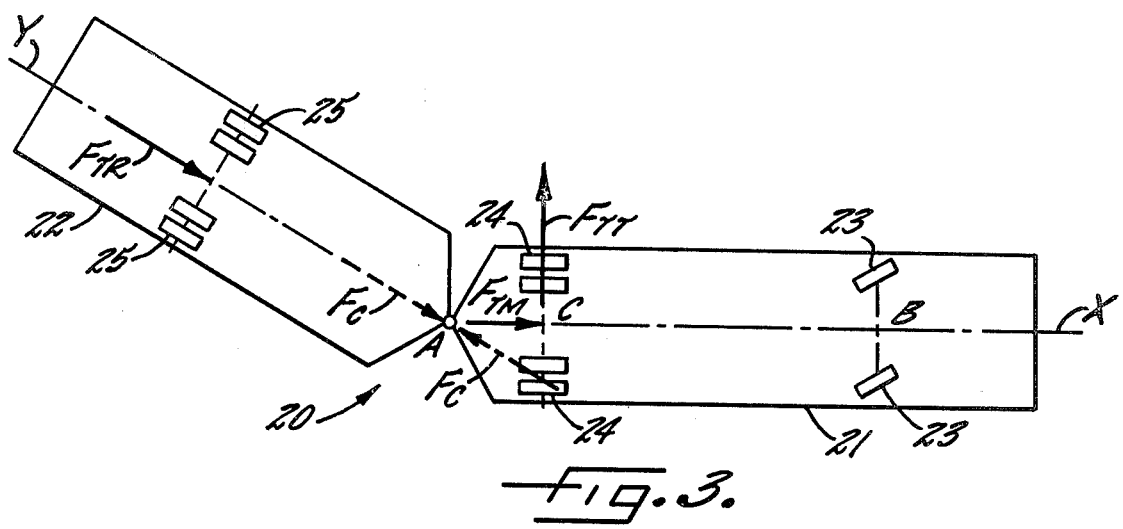
FIG. 3 is a plan diagram showing the forces acting upon an articulated vehicle in which a portion of the driving power is applied through the middle wheels.

Referring to FIG. 3, a diagram of both the forward and rear sections of an articulated vehicle 20 according to the present invention is illustrated in an operating condition in which the total propulsion force $F_P$ is divided between the rear wheels 25 and the middle wheels 24. That is, the algebraic sum of the traction force $F_{TR}$ at the rear wheels 25 and the traction force $F_{TM}$ at the middle wheels 24 is equal to the magnitude of $F_p$. The significance of such a division of power is that for the same total propulsive force $F_p$, the magnitude of force $F_C$ (shown in phantom in FIG. 3) at the articulation point A, is less than it would be for a classic "push"-type arrangement in which the total propulsive force $F_p$ is applied at the rear tires 25, as in FIG. 2. Applying the principles discussed above, for a given set of operating conditions (i.e., $W_M$, $\mu$ and $\alpha$), this reduction of the connection force $F_C$ will reduce the danger of jackknifing.

According to another aspect of the invention, the selective dividing of the total vehicle power between the rear and middle sets of tires can also be employed to correct another undesirable and potentially dangerous driving condition. In addition to the tendency to jackknife when $F_C$ exceeds the limit in the relationship above, loss of traction between the rear driving tires and the road surface may occur when the road surface is wet or icy, steeply inclined, or simply when excessive power is applied to the rear tires even under otherwise good driving conditions, regardless of whether the vehicle is cornering or traveling linearly. Such loss of traction, of course, is a problem with virtually any driven-wheel vehicle. Slippage between the rear tires and the road surface will occur at any time, regardless of the articulation angle $\alpha$, when $F_{TR} > W_R \cdot \mu$ where $W_R$ is the load at the rear tires 25 and $\alpha$ is the same coefficient of static friction employed in calculating $F_{TT}$, above. Referring again to FIG. 3, the reduction of the rear tire traction force $F_{TR}$, as by applying a portion of the power and, consequently a portion of the propulsion force $F_p$, to the middle axle tires 24 as $F_{TM}$, will reduce the danger of loss of rear wheel traction.

Accordingly, from the above discussion it will be appreciated that the same power-dividing system for preventing jackknifing due to transverse slippage of the middle tires 24 may also be employed to correct loss of traction at the rear tires 25. While separate phenomena, for a given set of operating conditions, the two are related. This relationship is even more apparent when the rear tire traction relationship is recast in terms of $F_C$. Since, as noted above, $F_{TR}$ is somewhat greater than $F_C$, loss of rear tire traction will necessarily occur when $F_C > W_R \cdot \mu$.

Figure 4:
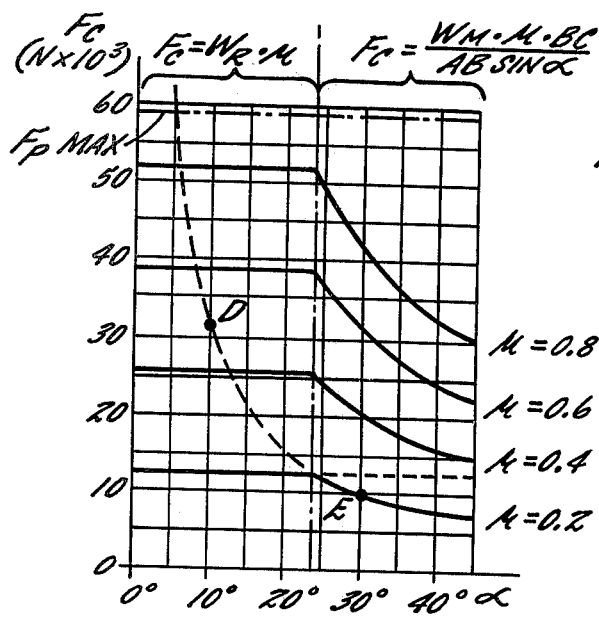
FIGS. 4–6 are graphs of $F_C$ versus the articulation angle $\alpha$ for several coefficients friction between the driving tires and the road.
Figure 5:
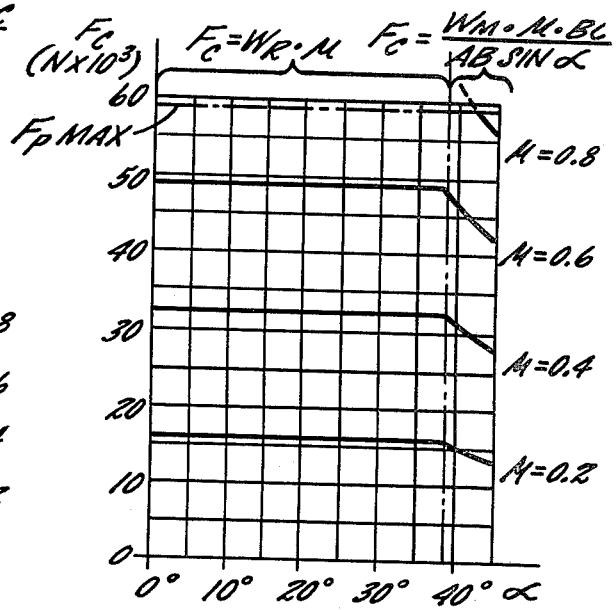
Figure 6:
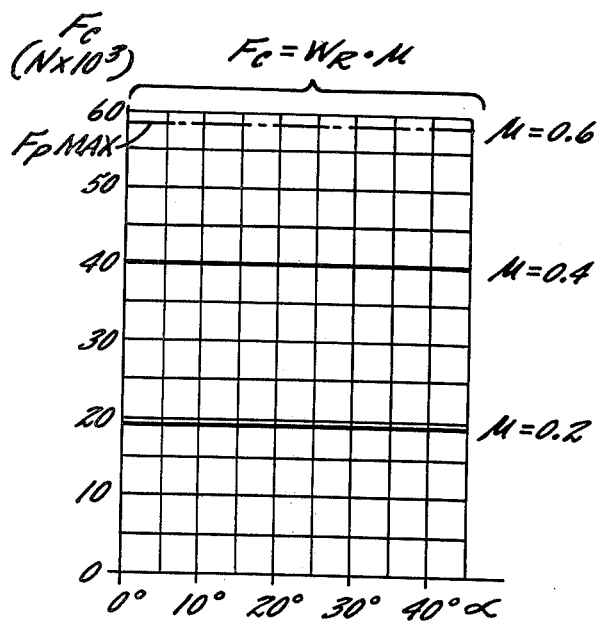

FIGS. 4-6 graphically illustrate the effective limitations on the connection force $F_C$ under a variety of operating conditions for an articulated vehicle, specifically an articulated bus, according to the invention. The parameters varied in these figures are rear and middle axle loading ($W_R$ and $W_M$), the coefficient of friction ($\mu$) and the articulation angle ($\alpha$). Referring first to FIG. 4, which assumes a bus operating without a passenger load, the limit on $F_C$ is plotted versus the articulation angle $\alpha$ for four different coefficients of friction $\mu$, i.e., 0.2, 0.4, 0.6 and 0.8. The values $W_R$ and $W_M$, in newtons, may be calculated by multiplying the respective loadings $M_R$ and $M_M$, in kilograms force, by the gravitational conversion factor 980 newtons/kilogram. The middle and rear axle loadings for the hypothetical bus without a load are $M_M = 3400$ kg and $M_R = 6670$ kg. The BC/AB ratio is assumed to be 0.8. The maximum $F_P$ which the vehicle engine and drive train are capable of producing, $F_{PMAX}$, is assumed to be about 59,000 newtons.

As indicated in FIG. 4, below about $\alpha = 24°$, $F_C$ is effectively limited to the level above which loss of rear tire traction is likely to occur. Accordingly, under about $\alpha = 24°$, this limitation is controlling over the independent consideration of whether jackknifing will occur. Above about $\alpha = 24°$, for a given $F_C$ jackknifing becomes the controlling consideration. For example, based upon the assumptions given above, regardless of articulation angle $\alpha$, $F_C$ as calculated from the traction relationship is 13,073 newtons for $\mu = 0.2$. For a 10° articulation angle $\alpha$ at the same coefficient of friction $\mu$, $F_C$ according to the middle tire jackknifing relationship is 30,815 newtons (Point D). Accordingly, as between the phenomena of loosing rear tire traction and jackknifing, the former will occur at a much lower $F_C$ value and serves the limiting factor. At a 30° articulation angle $\alpha$, however, $F_C$ according to the middle tire jackknifing relationship drops to 10,662 newtons (Point E). Hence, the $F_C$ limit as determined from the jackknifing relationship must serve as the limiting factor. The discontinuity in the curves at about 24° marks the point at which the two limitations are equal for this specific bus. In general the angle may be drived by equating the two relationships and solving for $\alpha$. Thus:

$$\alpha = \sin^{-1}((W_M \cdot BC)/(W_R \cdot AB))$$

Considering FIG. 5, curves for the same four coefficients of friction $\mu$ are again shown for an identical bus operating with half its capacity of passengers. $M_M$ is assumed to 6450 kg, with $M_R$ being 8200 kg. The curves shown in FIG. 5 again each have two distinct zones, a linear one representing the valve of $F_C$ above which loss of rear tire traction will occur even before a jackknifing risk develops, and a non-linear one representing the middle tire jackknifing limitation on $F_C$. As compared to the curves of FIG. 4, the FIG. 5 curves have the transition between limiting phenomena shifted to higher angles of articulation $\alpha$, i.e., about 39°. Furthermore, it should be noted that for $\mu = 0.8$, the maximum total propulsive force which the engine and drive train is capable of producing, $F_{PMAX}$, is the controlling limitation throughout the articulation angle range $\alpha = 0$-43°. Accordingly, under about 43°, neither loss of rear tire traction nor jackknifing should occur under any circumstances.

FIG. 6 shows the limits of $F_C$ for the same bus fully loaded with passengers, with $M_R$ assumed to be 10,000 kg and $M_M$ assumed to be 9500 kg. Under this condition, middle tire jackknifing stability is not a limiting factor for any articulation angle, even for coefficients of friction $\mu$ as low as 0.2 Furthermore, above about $\mu = 0.6$, $F_{PMAX}$ is again the controlling limitation on $F_C$.

According to the present invention, a portion of the power is shifted from the rear set of tires to the middle set of tires as required to maintain $F_C$ below the limitation according to the jackknifing relationship and/or the loss of rear tire traction relationship for a given set of operating conditions. From FIGS. 4-6 and the relationships from which the limits on $F_C$ are derived, it will be appreciated that numerous parameters must be determined to fully define the $F_C$ limitation curve for a specific operating condition. These include the distances AB and BC, constant for a given bus, and the variables $W_M$, $W_R$, $\alpha$ and $\mu$. Among other variables which can also affect the curve for a specific operating condition are acceleration, rolling friction, and the grade, if any, of the road surface. By continually monitoring each of these variables and feeding the respective inputs and constances into an on-board control system, the instantaneous limit on $F_C$ may be determined. By also monitoring the instantaneous power level being developed by the engine and drive train, the propulsion force $F_P$ may be derived. Then a portion of $F_P$ may be applied at the middle wheels 24, giving rise to a traction force $F_{TM}$ and reducing the traction force $F_{TR}$ at the rear wheels 25 to an acceptable level.

Figure 7:
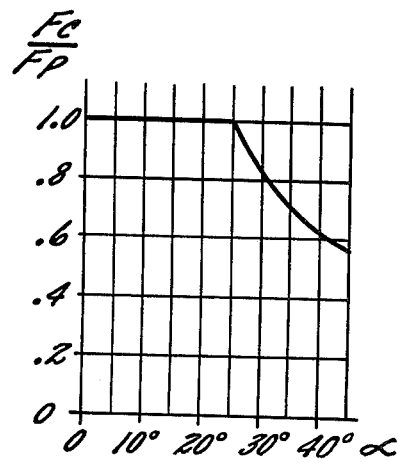
FIG. 7 is a graph of the ratio $F_C/F_P$ versus the articulation angle $\alpha$.

One drive system rule for avoiding jackknifing based upon certain simplifying assumptions is illustrated in FIG. 7. This shows the ratio of the connection force $F_C$ and the propulsion force $F_P$ as a function of the articulation angle $\alpha$. The rule is derived from the worst case illustrated in FIGS. 4-6, i.e., that for an articulated bus without a passenger load (FIG. 4). Each of the four curves shown in FIG. 4 are identical in shape, with the limit on $F_C$ for a given articulation angle $\alpha$ according to the relationships above being proportional to $\mu$. As illustrated in FIG. 4 and discussed above, jackknifing is not the controlling risk at articulation angles $\alpha$ under about 24°. Accordingly, assuming the bus is not experiencing loss of rear tire traction with rear wheel drive only, i.e., $F_P = F_{TR} < W_R \cdot \mu$, the fraction of the power which may be safely applied to the rear wheels 25 without causing jackknifing may be expressed as the ratio of the limit on $F_C$ as shown in FIG. 4 to the limit on $F_P$ under the assumed relationship above. For the assumed bus, this ratio will equal 1.0 for articulation angles $\alpha$ up to about 24° and will be an inverse function of the sin $\alpha$ for angles over 24°. Expressed generally in equation form, the drive system rule of FIG. 7 is as follows:

$$F_C/F_P = 1.0 \text{ when } \alpha < 24°$$

$$F_C/F_P = (W_M/W_R) \cdot (BC/AB) \cdot (1/\sin \alpha) \text{ when } \alpha < 24°$$

It will be appreciated that for a given vehicle in the unloaded condition, each of the parameters $W_M$, $W_R$, BC and AB are constant, such that the drive system rule of FIG. 7 may be expressed simply as:

$$F_C/F_P = K/\sin \alpha$$

where K is the constant derived from the four parameters noted above and the ratio has an upper of 1.0. It is also noted that, inasmuch as the occasions on which the articulation angle $\alpha$ can be expected to exceed about 24° are likely to represent a relatively small fraction of the total, the drive system rule above permits the middle wheel drive to remain completely inactive for a significant percentage of the time. This is significant in terms of energy-efficient operation.

FIG. 8 illustrates schematically an articulated bus drive and control system 26 according to the present invention. In addition to mechanical components, this figure includes a functional block diagram of the numerous parameters sensed and the algorithms employed for the ultimate control of the drive system. In all cases it is contemplated that the mathematical operations indicated may be performed, e.g., by conventional electronic subcircuits combined specifically for this application or by a conventional programmed microprocessor. The specific means are optional with the user and may be interchanged without departing from the spirit and scope of the invention.

The source of power for the drive system illustrated is a diesel engine 28. The diesel engine 26 drives the rear axle tires 25 mechanically through a conventional gear box/transfer case 29, transmission 30 and differential 31. In the embodiment shown the gear box 29 also drives an hydraulic pump 32. According to the invention, under certain circumstances, discussed in detail below, this hydraulic pump 32 employs a portion of the power from the engine 28 to drive an hydraulic motor 33 associated with each set of the middle wheels 24. Hydraulic lines 35 and 36 interconnect the pump 32 with the motors 33 to form a closed loop. While a hydraulic system is particularly advantageous in terms of compactness and flexibility, other means for selectively driving the middle wheels 24 might also be employed, e.g., an electric motor, a separate diesel engine, etc.

In keeping with the present invention, the displacements of both the hydraulic pump 32, hereinafter $V_p$, and the hydraulic motors 33, hereinafter $V_m$, are variable. The A4V series pumps manufactured by Hydromatik, GBMH, of the Federal Republic of Germany are examples of pumps which might be employed as pump 32 in the drive system 26 illustrated. The same company also manufactures an A6V series of variable displacement motors suitable for use as motors 33 in the schematic.

With such a variable displacement system, the middle axle wheels 24 may be made essentially freewheeling by adjusting the displacements $V_p$ and $V_m$ to maintain only a minimal pressure differential, hereinafter $\Delta P$, across the pump 32. Under these conditions the only power drawn from the diesel engine 28 by the pump unit 32 is the power required to compensate for system losses, e.g., losses due to compressibility of the hydraulic fluid and any power required to replace fluid lost from the closed circuit. Power may be almost instantly applied to the middle wheels 24 by either increasing the pump displacement $V_p$ or decreasing the motor displacements $V_m$ from that in the substantially pressure-equalized state. This displacement change will result in an increase in pressure differential $\Delta P$ and a corresponding increased consumption of the diesel engine power by the pump 32. This power will in turn be applied to the hydraulic motors 33, with the net result being a shifting of a portion of the power previously applied exclusively to the rear wheels 25 to the middle wheels 24.

According to known hydraulic principles, the variable displacement pump/motor circuit may be operated in a maximum delivery/minimum pressure mode to maximize the torque developed by the hydraulic motors 33 when called upon to operate under the particular drive system rule employed, e.g., the drive system rule of FIG. 7 discussed above. A representation of the general manner in which $V_m$, $V_p$ and $\Delta P$ vary for a variable displacement pump/motor circuit in such an operating mode is illustrated in FIG. 9.

Applying this principle to the drive and control system 26 illustrated, the motor displacement $V_m$ may be controlled solely as a function of the vehicle speed. As represented in FIG. 8, one manner in which this speed-dependent schedule of motor displacement variation can be effected is through the monitoring of the middle wheel spaced $S_M$ with a conventional speed sensing means (not shown). The output from this means may then serve as the input to further conventional means 38 for generating an appropriate control signal to set the pump displacement $V_m$ as a function of $S_M$. A model A6V-DA variable displacement motor manufactured by Hydromatik, GMBH, above, incorporates such a speed-related displacement control.

In the embodiment of the drive and control system 26 shown, the displacement $V_p$ of the pump 32 is controlled according to the drive system rule described above and illustrated in FIG. 7. Summarizing that drive system rule again, above a predetermined angle $\alpha$, e.g., 24°, the ratio of $F_C/F_P$ is controlled as a function of $\alpha$ specifically the reciprocal of the sine. The control system illustrated includes means for deriving the information necessary to apply this drive system rule. It should be understood, however, that this drive system rule is for exemplary purposes only and that other for schedules or algorithms for the division of power between the rear and middle wheels 25 and 24 might be employed in the practice of the invention. To the extent other drive system rules might require the monitoring of different or additional parameters, it is contemplated that one skilled in the art could select and employ the necessary means to gather and handle the required data.

Turning to a consideration of the manner in which the instantaneous connection force $F_C$ and articulation angle $\alpha$ are monitored in the drive and control system 26, FIG. 10 is an exploded view of an articulation connection 60 between the front and rear sections 21 and 22 as shown schematically in FIG. 8. This connection 60 is designed both to support the front of a single-axle rear section 22 and to transmit forward and reverse propulsive forces from the rear section 22 to the forward section 21 while permitting articulation of the rear section about the axes A and Z, as indicated by the arrows. In addition, in furtherance of the present invention, the articulation connection 60 incorporates the capacity to derive both the magnitude and direction of the connection force $F_C$ over a range of articulation of 45° in both directions. This range of articulation is generally sufficient to permit non-steering rear wheel vehicles into which it is incorporated to meet any minimum turning radius which might be established. A further significant advantage is that the overall height of the connection 60 may be kept at a minimum, i.e., about ten inches, with the result that the floor level above the connection may be maintained at a desirable, low level. Other advantages and features are discussed below.

Referring to FIG. 10, a D-shaped force-transmission element 61 is hingedly connected to a bracket 62 rigidly fixed to the rear bus section (not shown) with bolts 64. A pin 65 defines the transverse axis Z about which the force-transmission element 61 may pivot relative to the bracket 62. Limited twisting about the longitudinal axis Y of the rear section (see FIGS. 1-3) is permitted by a resilient bushing 68 within the bracket 62 through which the pin 65 passes.

The force-transmission element 61 cooperates with a mating force-receiving element 69 rigidly fixed to the rear of the forward section (not shown) with bolts 70. The semi-circular periphery of the transmission element 61 is formed with flanges 71 and 72 defining upper and lower horizontal, planar bearing surfaces 74 and 75. A semi-circular vertical bearing surface 76 extending between the surfaces 74 and 75 has a center of curvature at the axis A. According to an additional aspect of the present invention, in the embodiment shown the semi-circular force-receiving element 69 is adapted to receive braking pads, e.g., items 78 and 79, having braking surfaces 80 and 81 which establish sliding contact with the surfaces 74 and 75 of the force transmission element 61. Hydraulic or other means (not specifically shown) may be employed to vary the pressures which the pad surfaces 78 and 79 exert upon the surfaces 74 and 75 under certain operating conditions. While substantially unrestricted movement between elements 61 and 69 is desirable when the control system is operating, under certain conditions it might be desirable to damp or even prevent articulation about the axis A. One example is operation substantially linearly at highway speeds, where "fish-tailing" at the articulation axis A might occur without damping. Also, when maneuvering in a restricted area, as in a parking area, control might be enhanced effectively by "locking" the elements 61 and 69 relative to each other to permit operating the vehicle as a rigid unit. Control of the pressure to accomplish such damping or locking might be either automatic or manual, or both, depending on the specific circumstances under which this feature is utilized.

The rear tire traction force $F_{TR}$ of the rear section 22 (discussed above and illustrated in FIGS. 1 and 3) is transmitted through the articulation connection 60 to the forward section 21 as the connection force $F_C$ (see FIGS. 1-3) through the action of the bearing surface 76 upon two push rollers 82 positioned in vertical slots 84 in the concave, semi-circular periphery 85 of the force-receiving element 69. These push rollers 82 bear against push blocks 86 which, in turn, bear against two force-measuring transducers 87 fixed to the force-receiving element 69 with bolts 88. The push rollers 82 extend slightly beyond the periphery 85 of the force-receiving element 69 to maintain a spaced, substantially concentric, relationship between the semi-circular surface 76 of the force-transmission element 61 and the complementary, semi-circular periphery 85 of the force-receiving element 69 to assure that the entire connection force $F_C$ is borne by the force-measuring transducers 87. The vertical lines of contact between the two rollers 82 and the surface 76 of the force-transmission element 61 establish an effective vertical axis of rotation A for the element 61 (and consequently for the rear bus section 22) relative to the force receiving element 69, which, as explained above, is fixed to the forward bus section 21.

The details of one of the two identical sets of push rollers 82, push blocks 86 and force transducers 87 are shown in exploded view in FIG. 11. In the embodiment shown, each end of the push roller body 82a is hollow to accept a compression spring 82b for biasing the pivoting elements 82c into sliding contact with the opposing surfaces 75 and 76 of the force-transmission element 61 during operation. These elements 82c include depressions 82d for centering on the springs 82b and relative to the roller bodies 82a. The sliding surfaces 82e are relieved to accommodate foreign matter which might otherwise interfere with their movement. The push blocks 86 are sized for confined, floating movement within the slots 84 of the force-receiving element 69. These push blocks 86 cup the push rollers 82 while allowing the rollers to rotate about their axes as the force-transmission and force-receiving elements 61 and 69 pivot relative to one another. As above, the push block surfaces 86a are relieved to accommodate foreign matter. The flat surfaces 86b of the push blocks opposite the push rollers each bear against the convex head of one of the force transducers 87, establishing a point contact through which a component of the connection force $F_C$ is transmitted.

Disengagement of the force-transmission element 61 from its operative relationship with the push rollers 82 is prevented by three pull rollers 89 pivotally carried on pins 90 fixed to upper and lower plates 91 and 92. These plates 91 and 92 are in turn fixed by bolts 94 to the force-receiving member 69. The axes of the pull rollers 89 are equidistant from axis A such that their peripheries define an arc having a center of curvature at the axis A to mate and cooperate with surface 95 of the force transmission element, which also has a center of curvature at axis A. Accordingly, during braking, when operating the vehicle in reverse, on inclined roads, etc., pull rollers 89 will bear against and roll along the surface 95, permitting rolling contact therewith throughout a range of articulation angles α.

An additional feature of the articulation connection 60 described above is that the transmission of the connection force $F_C$ through the connection via the two force-measuring transducers 87 permits the mathematical derivation the connection force $F_C$ from the magnitudes of the measured components. This instantaneous actual force $F_C$ may then be compared to the limit on it from the jackknifing relationship above to indicate whether the rear tire propulsion force $F_{TR}$ should be reduced, as by diverting power to the middle tires 24.

Considering the mathematical derivation of the connection force $F_C$, the two sets of push rollers 82, push blocks 86 and force transducers 87 are positioned in the articulation connection 60 to sense the components of the connection force $F_C$ directed along radial lines from articulation axis A at 45° angles to the longitudinal axis X of the forward bus section 21. While angles other than 45° might be employed for sensing components of $F_C$, this arrangement is particularly advantageous for deriving both $F_C$ and $\alpha$ directly from the magnitudes of the measured forces. Referring to FIG. 12, the 45°-components are represented as $F_{C1}$ and $F_{C2}$. $F_C$ may be derived from the magnitudes of $F_{C1}$ and $F_{C2}$ as follows:

$$F_C = \sqrt{F_{C1}^2 + F_{C2}^2}$$

The articulation angle $\alpha$ may be derived from the following relationship:

$$\alpha = \tan^{-1}((F_{C1} - F_{C2})/(F_{C1} + F_{C2}))$$

Turning again to FIG. 8, the articulation connection 60 and its fundamental components are depicted schematically. In accordance with the explanation above, the outputs of the transducers 87 serve as the basis for calculating both the magnitude of $F_C$ and the articulation angle $\alpha$. Conventional electronic circuits 39 and 40 may be employed for these operations. The signal representing the articulation angle $\alpha$ in turn serves as the input to means 41 for deriving the ratio, $F_C/F_P$ (RULE), of the connection force $F_C$ to the propulsion force $F_P$ based upon the drive system rule discussed above and shown in FIG. 7.

The ratio of instantaneous actual the connection force to the instantaneous actual propulsion force, $F_C/F_P$ (ACTUAL), is shown derived at means 48 from the output $F_C$ of means 39, above, and the instantaneous propulsive force $F_P$. One method by which $F_P$ may be calculated is through the use of conventional transducers, not shown, to monitor the instantaneous power HP (e.g., through measurement of fuel flow) and the instantaneous diesel motor speed $S_D$ (e.g., through conventional speed sensing means). These signals may then be used for the derivation of a signal representing the torque T according to the relationship $T = HP/S_D$ at conventional means 42 for performing such a derivation. This output representing the torque T may then combined, as schematically represented at means 44, with the effective gearbox ratio $R_1$ and the constant representing the rear axle ratio $R_2$ (from means 45) and the radius r of the rear and middle tires 25 and 24 (from means 46) to derive the instantaneous total propulsion force $F_p$ as the product of these four inputs. By then taking the ratio of the instantaneous connection force $F_C$, as derived from the outputs of the transducers 87, to this instantaneous value of $F_p$, a signal representing $F_C/F_P$ (ACTUAL) may be generated by means 48.

Having thus generated signals for the instantaneous and control values for $F_C/F_P$ ratio, these signals may be compared at a means 50 to determine whether adjustment of the pump displacement $V_p$ is necessary to redistribute the power between the rear and middle wheels to equalize the $F_C/F_P$ (ACTUAL) and $F_C/F_P$ (RULE) values. If such an adjustment of the $V_p$ is required, means 50 can be designed to generate an appropriate signal $\delta V_p$ as an input to a means 51 for controlling the pump displacement $V_p$ to effect the displacement change. The continual monitoring of the various parameters discussed above will result in a closed loop feedback to constantly direct adjustments to the pump displacement $V_p$ as required.

By way of specific example of how the pump displacement might be controlled to establish the appropriate distribution of power between the rear and middle wheels, a pump series A4VEL manufactured by Hydromatik, GMBH, above, includes means for establishing the pump displacement $V_p$ as a function of the current of an electrical signal to the control module of the pump. Accordingly, the instantaneous magnitude of the current determines the pump displacement. In drive and control system 26 shown in FIG. 8, means 51 can be employed to generate an electrical signal (represented as $V_p$ in FIG. 8) having a controlled-magnitude current. Means 50 can then be employed to generate a signal $\delta V_p$ directing a change in the magnitude of the signal $V_p$ based upon the instantaneous comparison of the $F_C/F_P$ (ACTUAL) signal to that for $F_C/F_P$ (RULE).

The drive and control system 26 in FIG. 8 also illustrates the manner in which provision may be made for correction of a loss of rear tire traction condition. As discussed above, the upper limit on the rear tire traction force $F_{TR}$ may be expressed as $F_{TR} = W_R \cdot \mu$. While the parameters $W_R$ and $\mu$ might be continually monitored in an effort to avoid loss of rear tire traction according to the above relationship, as a practical matter, such loss of rear tire traction lends itself to detection through relatively simple means, as by monitoring and comparing the rear and middle speeds. Absent skidding of the middle wheels, a rear wheel speed greater than the middle wheel speed would indicate slippage at the rear wheels. When this occurs, regardless of whether $F_C$ is near the limit according to the jackknifing relationship, above, $F_{TR}$ should be reduced to reestablish traction between the rear wheels 25 and the road surface. As with the jackknifing control system described above, this may be accomplished by diverting a portion of the power from the rear wheels 25 to the middle wheels 24.

As shown by way of dotted lines in FIG. 8, this additional safety feature may be readily incorporated by adding a speed sensing means (not shown) at the rear wheels 25 or at the gearbox 30 to detect the rear wheel speed $S_R$. Then, by comparing the signals for $S_M$ and $S_R$ (above) at a comparator 52, a signal $\delta V_p'$ of the same type generated at the jackknifing comparator 50 may serve as a parallel input to the pump displacement control means 51. With this arrangement, when either a jackknifing condition is approached under the drive system rule (FIG. 7) or when loss of rear wheel traction is encountered, the displacement of the pump $V_p$ will be increased to apply power, either in the first instance or by way of addition, to the middle axle wheels 24.

Plan and elevational views of an articulated bus 20 incorporating a drive and control system 26 of the invention as illustrated in FIG. 8 are shown in FIGS. 13 and 14. The articulated bus 20 is shown comprised of a forward section 21 and a rear section 22 connected for articulation about point A in FIG. 13 and point Z in FIG. 14. The bus coach is omitted for clarity in the plan view of FIG. 13 and shown only in phantom in the elevational view of FIG. 14. As in FIG. 8, the diesel engine 28 drives the rear tires 25 mechanically through a conventional gear box/transfer case 29, transmission 30 and differential 31. The gear box 29 also drives an hydraulic pump 32. Having described the major components and their operation in detail above, no further explanation considered necessary for our understanding of the fundamental manner of operation of this specific embodiment.

Considering a specific aspect of the vehicle operation not already discussed in connection with FIG. 8, the vehicle 20 in FIGS. 13 and 14 may be operated in reverse with the mechanical rear wheel drive train by simply inactivating the middle wheel drive, as by establishing the pressure-equalized, free-wheeling condition for the middle wheels 24 as discussed above. Furthermore, the hydraulic middle wheel drive and control system may be supplemented to permit recovery of braking energy by effectively driving the motors 33 as pumps and storing the pressurized fluid, as in an accumulator, for assistance during acceleration.

A second embodiment of the invention is illustrated in FIGS. 15 and 16. The fundamental difference between this embodiment and that illustrated in FIGS. 13 and 14 is that not only the middle wheels but also the rear wheels are driven with hydrostatic motors. The principle advantage of such an arrangement is that the floor level of the rear section may be lower than in the FIGS. 13 and 14 embodiment above due to replacement of several bulky components of the drive train with more compact components which may be located at the extreme rear of the bus. As shown in FIGS. 15 and 16, the bus 100 has an overall configuration substantially identical to the FIGS. 13–14 embodiment. A forward section 101 is connected to a rear section 102 for articulation about the point A in FIG. 15 and Z in FIG. 16. A diesel engine 104 transversely mounted at the extreme rear of the bus drives a pair of hydraulic pumps 105 and 106 through a gear box 107. One of the pumps drives the middle wheels 108 through the hydraulic motors 109 in a manner identical to that described in connection with the drive of hydraulic motors 33 in FIG. 8. In a departure from the embodiment previously discussed, the other of the pumps drives the rear wheels 110 through the hydraulic motors 111. The hydraulic circuit for the rear wheels 25 must be capable at operation independent of the middle wheel drive and control system, and vice-versa, to assure the selective division of power between the two sets of wheels.

While not specifically illustrated, it is contemplated that the hydrostatic drive for the rear wheels be operated as a minimum pressure/maximum delivery mode with the pump and motor displacements being varied according to a schedule of the general type shown in FIG. 9. Also, in this embodiment, the hydraulic rear wheel drive must be capable of operation in reverse. In the case of hydraulic pumps of the type identified above, e.g., A4V-EL, this may be readily accomplished by simply reversing the polarity of the electrical signal which controls the pump displacement. Such reversal of the signal will effect a reversal in the direction of flow through the pump/motor circuit, resulting in the reverse driving of the rear wheels. In such an instance, the middle wheels may be freewheeling as discussed in connection with FIGS. 13 and 14.

I claim as my invention:

1. A method of propelling an articulated vehicle having a forward and rear section connected at an articulation connection, the vehicle having a source of driving power, the rear section having a first set of wheels driven by the source of driving power, the forward section having a second set of wheels for steering the vehicle, a third set of wheels and means for selectively applying driving power to the third set of wheels, said means being selectively actuated by a control means, the source of driving power generating a total propulsion force to be divided among and applied at the road surface by any driven wheels of the vehicle, the total propulsion force being applied to the road surface solely by the first set of wheels at times when the third set of wheels is not driven and applied in part by the first set of wheels and in part by the third set of wheels when both of said sets are simultaneously driven, the articulation connection transmitting a connection force between the forward and rear sections, the method comprising:

monitoring parameters with at least one transducer having an output from which values for the instantaneous angle of articulation between the sections and the magnitude of the connection force may be derived;

monitoring further parameters with at least one additional transducer having an output from which a value for the instantaneous magnitude of the total propulsion force generated by the source of driving power may be derived;

determining the actual ratio of the value for the derived connection force to the value for the derived propulsion force;

comparing the actual ratio to a ratio calculated from a predetermined drive system rule, the ratio calculated from the rule being a function of the instantaneous articulation angle;

driving only the first set of wheels when the actual ratio is less than the calculated ratio for the instantaneous articulation angle value; and actuating the means for applying power to the third set of wheels with the control means when the actual ratio is greater than the calculated ratio, thereby driving both the first and third sets of wheels, the proportion of the propulsive force applied by the third set of wheels being that sufficient to maintain the actual ratio less than the calculated ratio.

2. A method of driving an articulated vehicle having a forward and a rear section connected at an articulation connection and further having means for selectively operating the vehicle either as a push-type vehicle with rear section drive only or with both forward and rear section drive, the method comprising:

monitoring parameters with at least one transducer having an output from which a value for a force at the articulation connection tending to jackknife the vehicle may be derived;

comparing the value for the derived force to a value calculated according to a predetermined drive system rule representing the threshold above which jackknifing may occur, generating a control signal which varies depending upon the results of the comparison; and controlling the operating means with said control signal to selectively operate the vehicle as a push-type vehicle with rear section drive only when said derived value for the force is less than the threshold and to operate the vehicle with both forward and rear section drive when said derived value for the force exceeds the threshold.

3. In an articulated vehicle having a forward and a rear section connected at an articulation connection, a source of driving power, the rear section having a first set of wheels driven by the source of driving power, the forward section having a second set of wheels for steering the vehicle and a third set of non-steering wheels, the improvement comprising:
  means for selectively driving the third set of wheels with power from said source;
  means for monitoring parameters having at least one output from which a value for a force at the articulation connection tending to jackknife the vehicle may be derived;
  means for calculating a value according to a predetermined drive system rule representing the threshold above which jackknifing may occur;
  means for comparing the value for the derived force to a value calculated to be the threshold above which jackknifing may occur,
  means for generating a control signal which varies depending upon the results of the comparison; and
  means for controlling the selective driving means for the third set of wheels to apply a portion of the power from said source to the third set of wheels when said force exceeds the threshold according to the predetermined drive system rule.

4. An articulated vehicle comprising:
  a source of driving power;
  a rear section having a first set of wheels driven by the source of driving power;
  a forward section connected to the rear section at an articulation connection, the forward section having a second set of wheels for steering the vehicle and a third set of non-steering wheels;
  means for selectively driving the third set of wheels with power from said source;
  means for monitoring parameters having at least one output from which a value for a force at the articulation connection transverse to the longitudinal of the forward section and tending to jackknife the vehicle may be derived;
  means for calculating a value according to a predetermined drive system rule representing the threshold above which jackknifing will occur;
  means for comparing the value for the derived transverse force to a value calculated to be the threshold above which jackknifing will occur,
  means for generating a control signal which varies depending upon the results of the comparison; and
  means for controlling the selective driving means for the third set of wheels to apply a portion of the power from said source to the third set of wheels when said derived force exceeds the threshold according to the predetermined drive system rule.

5. The method of claim 1, the ratio calculated from the predetermined drive system rule being a function of the reciprocal of the sine of the articulation angle for at least the upper range of articulation angles.

6. The method of claim 1, the values for the instantaneous articulation angle and the magnitude of the connection force being derived from the outputs of two force-measuring transducers oriented in a predetermined geometric relationship to one another and detecting components of the connection force.

7. The method of claim 6, the components of the connection force detected by the two force-measuring transducers being the components directed radially from the effective point of articulation at 45 degree angles to each side of the longitudinal axis of the forward section.

8. The articulated vehicle of claim 3 or 4, further comprising means for sensing loss of rear wheel traction, the means for controlling the selective driving means also being responsive to the sensing means to apply a portion of the power from said source to the third set of wheels to reduce power at the first set of wheels.

9. The articulated vehicle of claim 3 or 4, the threshold being a function of the instantaneous articulation angle and the connection force, the monitoring means comprising at least two transducer means at the articulation connection having outputs from which values for the instantaneous articulation angle and the magnitude of the connection force may be derived.

10. The articulated vehicle of claim 10, the means at the articulation connection comprising two force-measuring transducers oriented in a predetermined geometric relationship to one another and detecting components of the connection force, the monitoring means further comprising means for deriving the instantaneous articulation angle and the magnitude of the connection force from the transducer outputs.

11. The articulated vehicle of claim 10, the force-measuring transducers being oriented to sense the components of the force at the articulation connection directed radially from the effective point of articulation at 45 degree angles to each side of the longitudinal axis of the forward section.

* * * * *

UNITED STATES PATENT AND TRADEMARK OFFICE
CERTIFICATE OF CORRECTION

PATENT NO. : 4,320,811

DATED : March 23, 1982

INVENTOR(S) : Gerard Queveau

It is certified that error appears in the above—identified patent and that said Letters Patent is hereby corrected as shown below:

Column 1, line 15, change "catagorized" to -- categorized --;

Column 1, line 27, delete "a";

Column 4, line 11, delete "above" and substitute -- about --;

Column 5, line 7, delete "$\alpha$" and substitute -- $\mu$ --;

Column 5, line 31, delete the symbol in the first parenthesis and substitute -- $\mu$ --;

Column 6, line 7, after "to" insert -- be --;

Column 6, line 9, delete "valve" and substitute -- value --;

Column 6, line 28, insert -- . -- after 0.2;

Column 7, line 12, delete " $<$ " and substitute -- $>$ --;

Column 8, line 37, delete "spaced" and substitute -- speed --.

UNITED STATES PATENT AND TRADEMARK OFFICE
CERTIFICATE OF CORRECTION

PATENT NO. : 4,320,811

DATED : March 23, 1982

INVENTOR(S) : Gerard Queveau

It is certified that error appears in the above—identified patent and that said Letters Patent is hereby corrected as shown below:

Column 8, line 50, after "α" insert -- , --;

Column 11, line 13, the squared symbols should follow the subscripts;

Column 11, line 18, the outside parenthesis should be absolute value symbols;

Column 11, line 46, after "then" insert -- be --;

Column 12, line 6, delete "A4VEL" and substitute -- A4V--EL --.

Signed and Sealed this

Twenty-seventh Day of July 1982

[SEAL]

Attest:

Attesting Officer

GERALD J. MOSSINGHOFF

Commissioner of Patents and Trademarks